United States Patent
Stefanelli

(10) Patent No.: US 9,282,802 B2
(45) Date of Patent: Mar. 15, 2016

(54) CONTAINER FOR FLUID PRODUCTS, IN PARTICULAR PERFUMES, DEODORANTS, CREAMS AND SIMILAR

(76) Inventor: Paolo Stefanelli, Milan (IT)

(*) Notice: Subject to any disclaimer, the term of this patent is extended or adjusted under 35 U.S.C. 154(b) by 1000 days.

(21) Appl. No.: 12/864,868

(22) PCT Filed: Jun. 25, 2008

(86) PCT No.: PCT/IT2008/000429
§ 371 (c)(1),
(2), (4) Date: Oct. 7, 2010

(87) PCT Pub. No.: WO2009/095943
PCT Pub. Date: Aug. 6, 2009

(65) Prior Publication Data
US 2011/0043364 A1    Feb. 24, 2011

(30) Foreign Application Priority Data
Jan. 28, 2008    (WO) ................ PCT/IT2008/000045

(51) Int. Cl.
| | |
|---|---|
| *A47J 31/46* | (2006.01) |
| *B65D 75/58* | (2006.01) |
| *B67D 7/34* | (2010.01) |
| *G06K 19/077* | (2006.01) |
| *G06K 7/10* | (2006.01) |

(Continued)

(52) U.S. Cl.
CPC ............. *A45D 34/00* (2013.01); *A45D 34/04* (2013.01); *A47J 31/46* (2013.01); *B67D 7/348* (2013.01); *G08B 13/2445* (2013.01); *A45D 2200/057* (2013.01); *B65D 75/5805* (2013.01); *B65D 2101/00* (2013.01); *B65D 2101/0007* (2013.01); *B65D 2203/10* (2013.01); *G06K 7/10297* (2013.01); *G06K 19/0776* (2013.01); *G06K 19/07749* (2013.01); *G06K 19/07798* (2013.01); *G09F 3/0292* (2013.01); *G09F 3/0335* (2013.01); *H04B 5/0062* (2013.01); *Y10T 29/49826* (2015.01)

(58) Field of Classification Search
None
See application file for complete search history.

(56) References Cited

U.S. PATENT DOCUMENTS

| | | | |
|---|---|---|---|
| 5,790,029 A | 8/1998 | Curnutte et al. | |
| 7,009,519 B2 * | 3/2006 | Leonard et al. | ............ 340/572.8 |

(Continued)

FOREIGN PATENT DOCUMENTS

| | | |
|---|---|---|
| DE | 102004040831 | 3/2006 |
| EP | 1837798 | 9/2007 |

(Continued)

OTHER PUBLICATIONS

PCT International Search Report for PCT/IT2008/000429 filed on Jun. 25, 2008 in the name of Stefanelli, Paolo.

(Continued)

*Primary Examiner* — Mohamed Barakat
(74) *Attorney, Agent, or Firm* — Steinfl & Bruno LLP

(57) ABSTRACT

A container for fluid products, in particular perfumes, deodorants, creams and the like, comprising: a holding body (2) for containing the fluid (6), preferably a perfume, deodorant or similar product; a dispensing member (3) associated with said holding body (2) and having a tube (4) to draw said fluid (6) from the holding body, and a spray head (5) to dispense the fluid drawn by said tube (4), said spray head (5) being at least partly inserted in said holding body (2). The container (1) also comprises a transponder device (8) of the near-field type.

9 Claims, 3 Drawing Sheets

Figure 1:
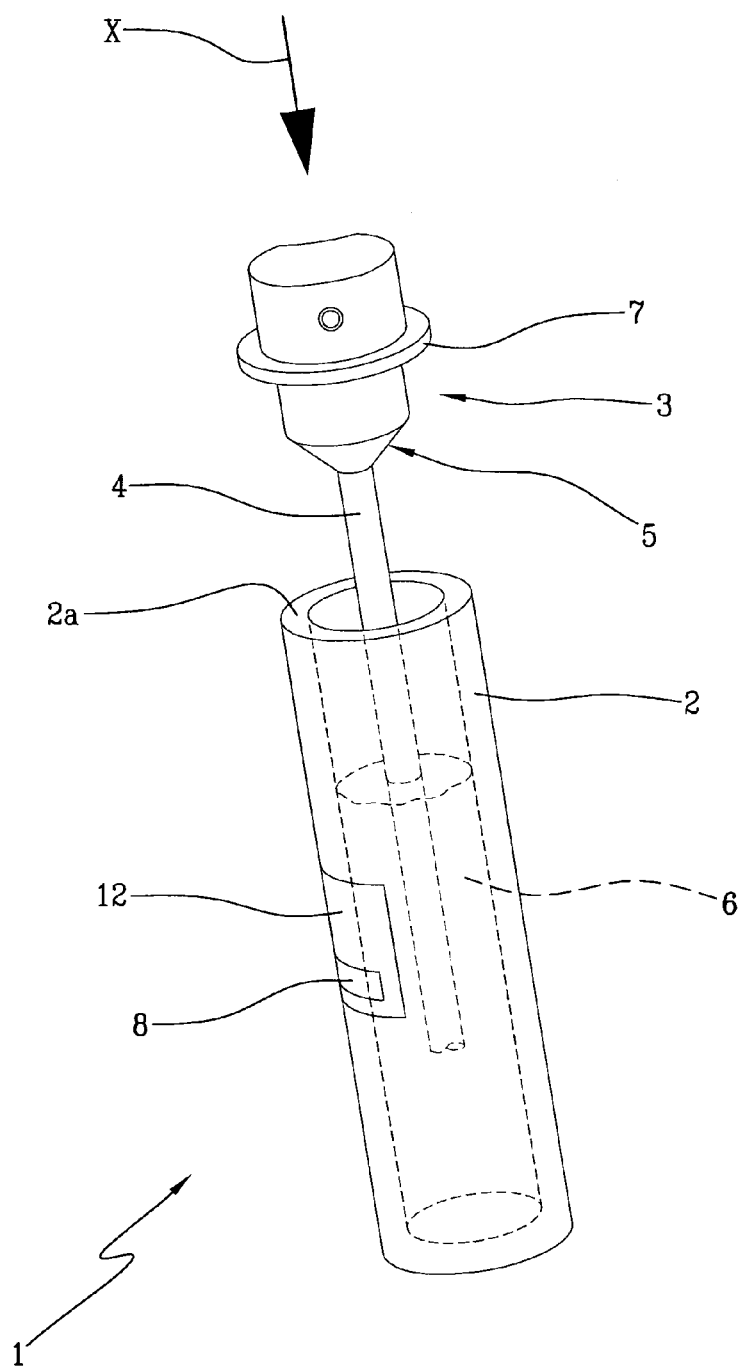

(51) Int. Cl.
  *G08B 13/24*  (2006.01)
  *G09F 3/00*   (2006.01)
  *G09F 3/03*   (2006.01)
  *H04B 5/00*   (2006.01)
  *A45D 34/00*  (2006.01)
  *A45D 34/04*  (2006.01)

(56) References Cited

U.S. PATENT DOCUMENTS

| | | |
|---|---|---|
| 2003/0109068 A1 | 6/2003 | Garcia et al. |
| 2006/0001525 A1 | 1/2006 | Nitzan et al. |
| 2006/0109192 A1* | 5/2006 | Weigand ............... 343/795 |
| 2006/0157369 A1 | 7/2006 | Fresnel |
| 2006/0186995 A1* | 8/2006 | Wu et al. ............... 340/10.1 |
| 2006/0187039 A1* | 8/2006 | Bui et al. ............... 340/572.1 |
| 2006/0289679 A1 | 12/2006 | Johnson et al. |
| 2007/0008140 A1 | 1/2007 | Saarisalo et al. |
| 2007/0029382 A1 | 2/2007 | Baker et al. |
| 2007/0095925 A1* | 5/2007 | Zhu et al. ............... 235/492 |
| 2007/0126580 A1* | 6/2007 | Roth ............... 340/572.1 |
| 2007/0188329 A1 | 8/2007 | Garcia et al. |
| 2007/0214055 A1* | 9/2007 | Temko ............... 705/22 |
| 2007/0250707 A1* | 10/2007 | Noguchi ............... 713/164 |
| 2008/0056691 A1* | 3/2008 | Wingo et al. ............... 392/395 |
| 2008/0061986 A1 | 3/2008 | Ficker et al. |
| 2008/0191884 A1 | 8/2008 | Garcia et al. |

FOREIGN PATENT DOCUMENTS

| | | |
|---|---|---|
| FR | 2864035 | 6/2005 |
| FR | 2876200 | 4/2006 |
| WO | 2004/049237 | 6/2004 |
| WO | 2006-097760 | 9/2006 |
| WO | 2006/131545 | 12/2006 |

OTHER PUBLICATIONS

PCT Written Opinion for PCT/IT2008/000429 filed on Jun. 25, 2008 in the name of Stefanelli, Paolo.
PCT International Search Report for PCT/IT2008/000045 filed on Jan. 28, 2008 in the name of Stefanelli, Paolo.
PCT Written Opinion for PCT/IT2008/000045 filed on Jan. 28, 2008 in the name of Stefanelli, Paolo.
United States Non-Final Office Action mailed on Jun. 20, 2013 for U.S. Appl. No. 12/864,869, filed Oct. 7, 2010 in the name of Paolo Stefanelli.
European Communication 94(3) mailed on Oct. 29, 2013 for EP Application 08790018-9 filed on Oct. 7, 2010 in the name Paolo Stefanelli.
Non-Final Office Action mailed on Feb. 20, 2015 for U.S. Appl. No. 12/864,869, filed Oct. 7, 2010 in the name of Paoli Stefanelli.
Final Office Action mailed on Jul. 31, 2014 for U.S. Appl. No. 12/864,869, filed Oct. 7, 2010 in the name of Paoli Stefanelli.

* cited by examiner

CONTAINER FOR FLUID PRODUCTS, IN PARTICULAR PERFUMES, DEODORANTS, CREAMS AND SIMILAR

CROSS REFERENCE TO RELATED APPLICATIONS

The present application is the US national stage of International Application PCT/IT2008/000429 filed on Jun. 25, 2008 which, in turn, claims priority to International Patent Application PCT/IT2008/000045, filed on Jan. 28, 2008. The present application may be related to U.S application Ser. No. 12/864,869 which is the US national stage of International Application PCT/IT2008/000045.

The present invention relates to a container for fluid products, in particular perfumes, deodorants, creams and similar products.

It is known that currently used on containers to be marketed and in particular containers for cosmetic and pharmaceutical products are plates reproducing brand, model, price and other possible descriptive data of the product that are required for correct and efficient trackability and logistic management of the product.

These plates can be bar codes containing the information relating to the product to be read by suitable optical systems.

The bar code, due to its own nature, has non-negligible sizes as compared with the sizes of the perfumes' containers and has contrasting chromatic tones to enable easy reading by the optical reader.

Due to these features of the bar codes, integration of them with the refined finish required for perfumery products is of difficult achievement, above all when the products are very valuable.

To obviate the above drawback, use of a tag or transponder of the RFID type (Radio Frequency IDentification type, usually based on ISO standards) is known, which consists of at antenna and a microchip of small sizes comprising a non-volatile memory containing the identification data of the product.

Said tag is read by a suitable reader emitting an electromagnetic field that, through an induction process, generates in the tag's antenna, a current feeding the microchip. The microchip thus fed communicates the identification data of the product that are irradiated through the antenna and received by the reader.

The tag can be easily concealed by disposing it between the label and the bottle for example, so that it is not directly in sight. Thus the surface finish of the perfumery product surely is not altered by the presence of said tag.

However, to enable the RFID tags present on the perfumery goods to transmit the information contained therein, they must be disposed so as to directly face the reader, because the perfume bottles contain liquids, and generally fluids, in addition to metals present in the liquid dispensing device, that do not allow an optimal propagation of the required electromagnetic fields for reading of the tags.

Therefore, it is necessary to go on turning the bottle until the tag and reader directly face each other. This drawback is much more tiresome when the tag is concealed, behind the label and therefore, is not in sight.

In this context, the technical task underlying the present invention is to make available a container for fluid products, in particular perfumes, deodorants, and the like, in which the above mentioned drawbacks are not present.

In particular, it is an aim of the present invention to provide a container for fluid products, in particular perfumes, deodorants and the like, the identification data of which are of easy and prompt access.

Another aim of the invention is to provided a container for fluid products in which the identification data can be easily secured to the container itself.

The foregoing and further aims are substantially achieved by a container for fluid products in accordance with the features recited in the appended claims.

Further features and advantages will become more apparent from the detailed description of a preferred but not exclusive embodiment of a container in accordance with the invention.

Figure 2:
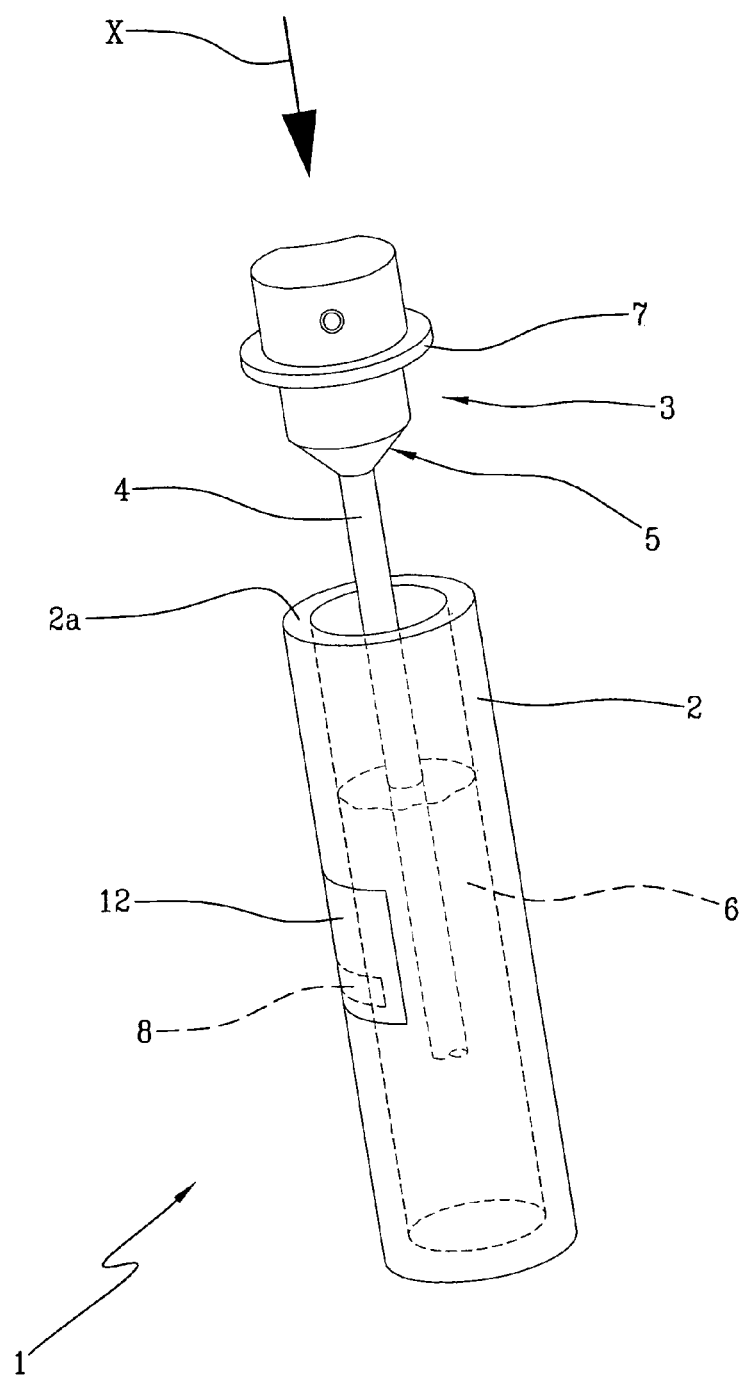
Figure 3:
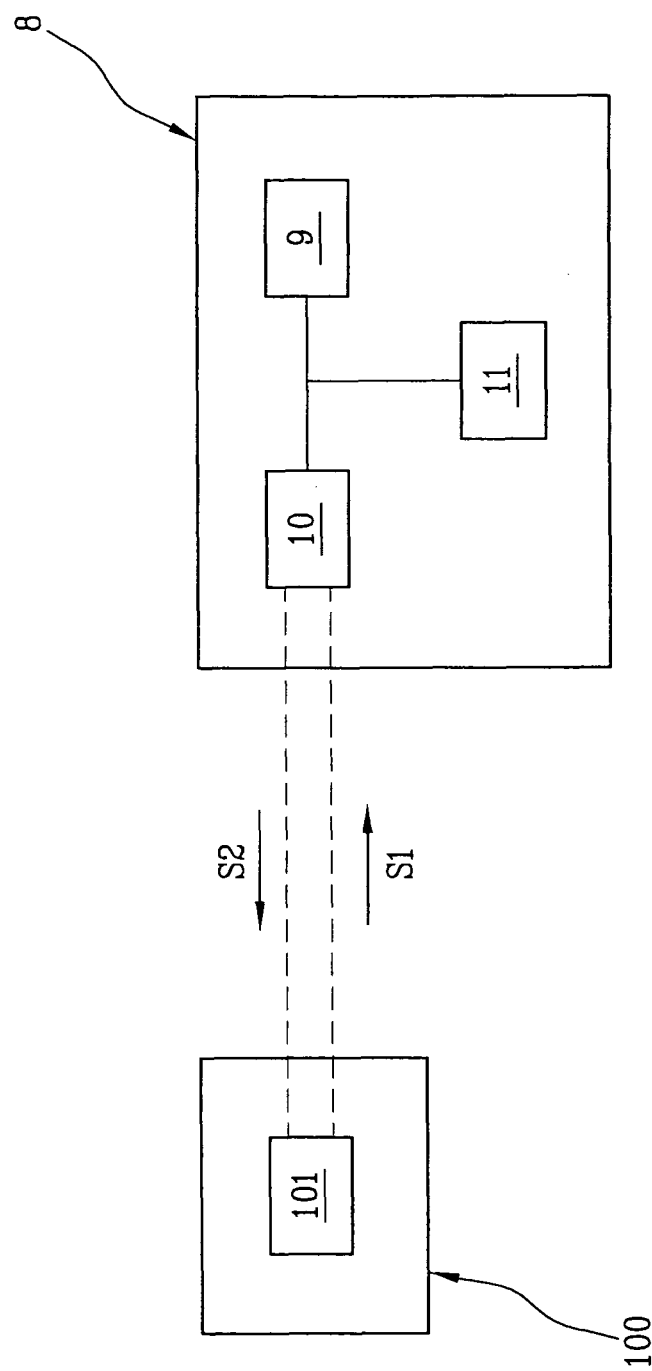

This description is taken hereinafter with reference to the attached drawings, given by way of non-limiting example, in which:

FIG. 1 diagrammatically shows a perspective view of a container in accordance with the invention;

FIG. 2 diagrammatically shows an alternative embodiment of the container seen in FIG. 1; and FIG. 3 is a block diagram of a device being part of the container shown in FIG. 1.

With reference to the drawings, a container for fluid products in accordance with the present invention has been generally identified by reference numeral 1.

Preferably, the present invention advantageously applies to the field of perfumes of very high commercial value. However, the invention can be generally exploited every time use of containers holding fluids is provided.

Container 1 can be a small bottle for example or a bottle of bigger size made of any material such as glass, plastic or metal material, capable of holding products in a liquid or semiliquid form such as perfumes, deodorants, foams, gels, etc.

Container 1 (FIGS. 1 and 2) comprises a holding body 2 for containing a fluid, one of the above specified products for example.

Container 1 further comprises a dispensing member 3, associated with the holding body 2 and having a tube 4 and a spray head 5.

The function of tube 4 is to draw the fluid 6 present within the holding body 2. To this aim, tube 4 is at least partly dipped into the fluid 6 contained in the holding body 2.

The spray head 5 is operatively associated with tube 4 to spray the fluid drawn through the tube 4 itself.

Preferably the spray head 5 comprises pump means to exert a predetermined pressure so as to draw and spray the fluid 6 contained in said holding body 2.

In the preferred embodiment, the spray head 5 and the related pump means are activated following operation by a user from the outside, in the direction identified by arrow "X".

The spray head 5 is at least partly inserted in the holding body. In FIG. 1 the spray head 5 is shown fully at the outside of the holding body 2 in order to better highlight the structure of container 1.

When container 1 is fully assembled, a flange 7 of the spray head 5 is in contact with an upper edge 2a of the holding body 2 so that the spray head is indeed at least partly inserted in the holding body 2 itself.

Container 1 further comprises a transponder device 8 of the "near field" type. In the context of the present specification and in the claims by "near field" it is intended a short-range and high-frequency wireless data transmission technology enabling data exchange to a distance of about 10-30 cm.

The "near field" technology is described in ISO/IEC 18092:2004, ISO/IEC 21481:2005 ECMA-340 and ECMA-352 standards.

Preferably the near-field transponder device 8 is provided with a memory 9 to store the main data representative of container 1 and/or of the fluid 6 contained therein. By way of example, the main data can comprise an identification code of container 2 so that the same can be uniquely identified among, other containers holding the same fluid.

The main data can also comprise origin and composition of the product and any other useful information to enable tracking, storage and/or logistic management of container 1.

Preferably the near-field transponder device 8 is also provided with an antenna 10 operatively associated with memory 9 for receiving at least one request signal S1 and transmitting at least one corresponding answerback signal S2.

The request signal S1 is a signal generated by a reader 100 with which the near-field transponder device 8 co-operates (FIG. 3).

The request signal S1 can define a magnetic field within which the near-field transponder device 8 is positioned so as to co-operate with reader 100.

Preferably said answerback signal S2 incorporates at least some of said main data and preferably said identification code.

In the preferred embodiment the near-field transponder 8 further comprises a transmission module 11 operatively connected to memory 9 and antenna 10 to generate the answerback signal S2. Preferably, the near-field transponder device 8 co-operates with reader 100 by means of a magnetic induction.

Preferably, antenna 10 of the near-field transponder device 8 has an annular conformation, specifically represented by a plurality of substantially coplanar turns defining a spiral-like structure.

Preferably antenna 101 of reader 100 has an annular conformation as well, in particular represented by a plurality of substantially coplanar turns defining a spiral-like structure.

Advantageously, the above mentioned two antennas 10, 101 communicate with each other when they are positioned to a mutual distance not exceeding a predetermined threshold, lower than 30 cm for example, in particular lower than 10 cm.

Under these conditions, the two antennas 10, 101 form a transformer the core of which is made up of the medium or media interposed between the two antennas, these media being for example air, air and fluid, or metal, air and fluid, etc.

Preferably, communication takes place to a frequency of 13.56 MHz; the band used can have a width up to 2 GHz, for example.

Preferably, the near-field transponder 8 is compatible with the ISO 14443 standard, so that readers traditionally used with RFID technology can be used with the near-field transponder 8.

Preferably, the near-field transponder device 8 is compatible, with the EPC GEN2 ISO 18000-6c standard.

Advantageously the near-field transponder device 8 is able to correctly operate also if one or more elements forming it (memory 9, antenna 1 and preferably transmission module 11) are brought into contact with liquid or fluid substances, and/or if transmission/reception of the request/answerback signals, S1, S2, must partly or fully take place through a liquid, fluid, gel-like, metallic, plastic, wooden substance or a combination thereof.

Communication can also occur to a frequency of 860-960 MHz and be compatible with GS1 standards (www.gsl.org) and EPC code (Electronic Product Code). This enables standard UHF readers to be used even if they are not specifically provided for the near-field technology. This allows interoperability and tracking over the whole chain of distribution of the goods, without resorting to specific readers.

In addition, this enables reading distances higher than those typical of the near-field technology to be reached, so that use of device 8 also for reading the contents of a case or carton for logistic purposes and for anti-shoplifting purposes in shops is allowed, through standard UHF readers.

By way of example, in addition to containers used in the cosmetic and pharmaceutical field, also to be taken into account are containers used in the food field, which contain liquids (beverages, for example) and are provided. with caps or closing elements of metal material.

Preferably, the near-field transponder device 8 is mounted on the holding body 2, as shown in FIGS. 1 and 2. In particular, the near-field transponder device 8 is mounted on a label 12 applied to the outer surface of the holding body 2 (FIG. 1). Alternatively, the near-field transponder device 8 is mounted between the label 12 and the holding body 2 (FIG. 2).

Preferably, the near-field transponder device 8 has a substantially laminar conformation. In this manner, the near-field transponder device 8 can be deformed so as to suitably adhere to the side surface of the holding body 2, either if the near-field transponder device 8 is applied to label 12, or if it is applied under said label 12.

The invention achieves the intended purposes.

First of all, in the container in accordance with the invention the transponder device is fastened to the container itself in a safe and reliable manner.

In addition, the near-field transponder is fastened to the container in a simple and cheap manner.

Furthermore, the near-field transponder device can be activated, and therefore the information therein contained read, also without the transponder directly facing the reader.

Finally, transmission/reception of the request/answerback signals can partly or fully take place through a liquid, fluid, gel-like, metallic, plastic, wooden substance and still other substances, as the interposition of air alone between reader and transponder is not necessarily required.

The invention claimed is:

1. A container for fluid products, comprising:
a holding body to contain a fluid,
a dispensing member associated with said holding body and comprising:
   a tube to draw said fluid from the holding body; and
   a spray head to dispense the fluid drawn by said tube, said spray head being at least partly inserted in said holding body, and
a near-field transponder device comprising an antenna, a memory device and a transmission module, said memory device comprising a plurality of data, the near-field transponder device being configured to transmit at least some of said plurality of data to a reader via the antenna responsive to a request signaling generated by the reader, as an answerback signaling transmitted by the near-field transponder device to the reader,
wherein:
   the near-field transponder device is configured to operate at a frequency equal to 13.56 Mhz at a distance smaller than 30 cm, and
   said near-field transponder device is able to correctly operate if any of one or more of said antenna, memory device and transmission module are brought into contact with the fluid, wherein the request signaling and answerback signaling exchanged with the reader partly or fully take place through said fluid which comprises one of: a) a perfume, b) a deodorant, and c) a cream.

2. The container as claimed in claim 1, wherein:
said plurality of data comprises main data representative of the fluid and/or the container; and
said antenna is operatively associated with said memory device for receiving at least one request signal from the reader and transmitting at least one corresponding answerback signal to the reader, the answerback signal incorporating at least some of said main data.

3. The container as claimed in claim 2, wherein said antenna has an annular conformation.

4. The container as claimed in claim 2, wherein said antenna is defined by a plurality of substantially coplanar turns.

5. The container as claimed in claim 1, wherein said near-field transponder device has a substantially laminar conformation.

6. The container as claimed in claim 1, wherein said near-field transponder device is compatible with the ISO 14443 standard and/or the EPC GEN2 ISO 18000-6c standard.

7. The container as claimed in claim 1, wherein said holding body is made of metal.

8. The container as claimed in claim 1, wherein said holding body is made of plastic material.

9. A system comprising:
(i) a reader configured to request and receive data from a near-field transponder device; and
(ii) a container for fluid products, comprising:
(a) a holding body to contain a fluid,
(b) a dispensing member associated with said holding body and comprising:
a tube to draw said fluid from the holding body; and
a spray head to dispense the fluid drawn by said tube, said spray head being at least partly inserted in said holding body, and
(c) the near-field transponder device, wherein the near-field transponder device comprises an antenna, a memory device and a transmission module, said memory device comprising a plurality of data, the near-field transponder device being configured to transmit at least some of said plurality of data to the reader via the antenna responsive to a request signaling generated by the reader, as an answerback signaling transmitted by the near-field transponder device to the reader,
wherein
the near-field transponder device is configured to operate at a frequency equal to 13.56 Mhz at a distance smaller than 30 cm, and
said near-field transponder device is configured able to correctly operate if any of one or more of said antenna, memory device and transmission module are brought into contact with the fluid, wherein the request signaling and answerback signaling exchanged with the reader partly or fully take place through said fluid which comprises one of: a) a perfume, b) a deodorant, and c) a cream.

* * * * *